United States Patent
Chaturvedi et al.

(10) Patent No.: US 11,262,932 B2
(45) Date of Patent: Mar. 1, 2022

(54) HOST-AWARE DISCOVERY AND BACKUP CONFIGURATION FOR STORAGE ASSETS WITHIN A DATA PROTECTION ENVIRONMENT

(71) Applicant: EMC IP Holding Company LLC, Hopkinton, MA (US)

(72) Inventors: Shivam Chaturvedi, Bangalore (IN); LahariCharan Bejjanke, Warangal (IN); Sanjeev Lochab, Banglore (IN); Pawan Singh, Bangalore (IN); Rintu Kanp, West Bengal (IN); Upanshu Singhal, Banglore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/830,874

(22) Filed: Mar. 26, 2020

(65) Prior Publication Data
US 2021/0334001 A1   Oct. 28, 2021

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC .......... G06F 3/065; G06F 3/067; G06F 3/0619
See application file for complete search history.

(56) References Cited

U.S. PATENT DOCUMENTS

| | | | |
|---|---|---|---|
| 7,197,660 B1 * | 3/2007 | Liu ...................... | G06F 11/2035 714/4.12 |
| 10,496,556 B1 * | 12/2019 | Colgrove .............. | G06F 3/0619 |
| 2019/0132314 A1 * | 5/2019 | Haravu ............... | H04L 67/1097 |

* cited by examiner

*Primary Examiner* — Hiep T Nguyen
(74) *Attorney, Agent, or Firm* — Dergosits & Noah LLP; Todd A. Noah

(57) ABSTRACT

Described is a system for discovering and configuring backup settings for protectable storage assets of a storage array. The system may perform such discovery and configuration for a storage array by providing an efficient centralized management capability. In addition, the centralized management capability allows for the creation of backup policies that are host-aware. Accordingly, the system may account for the interrelationship between storage devices, storage groups, and host devices to prevent potential inconsistencies and conflicts that may arise when creating a centralized backup policy.

20 Claims, 4 Drawing Sheets

HOST-AWARE DISCOVERY AND BACKUP CONFIGURATION FOR STORAGE ASSETS WITHIN A DATA PROTECTION ENVIRONMENT

TECHNICAL FIELD

This disclosure relates to managing data storage systems, and more particularly, automatically discovering and configuring storage devices associated with particular hosts within a storage system for data protection.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As part of managing such a data storage service, providers may implement various tools to backup storage assets (e.g. storage devices) that are provided to clients. For example, a data protection environment may include various hosts associated with storage assets that are organized into various storage groups. Accordingly, a large number (e.g. hundreds or thousands) of storage groups and assets may be interrelated. As a result, various tools are required to automate the management of backup polices for such storage assets. For example, once certain assets are discovered within the data protection environment, they are typically presented to a user as a selectable storage asset to include in a centralized protection policy. However, selecting storage assets without accounting for particular hosts may lead to various backup inconsistencies and conflicts. Accordingly, there is a continued need to provide centralized tools for managing storage assets that may be associated with certain hosts of a data storage system.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
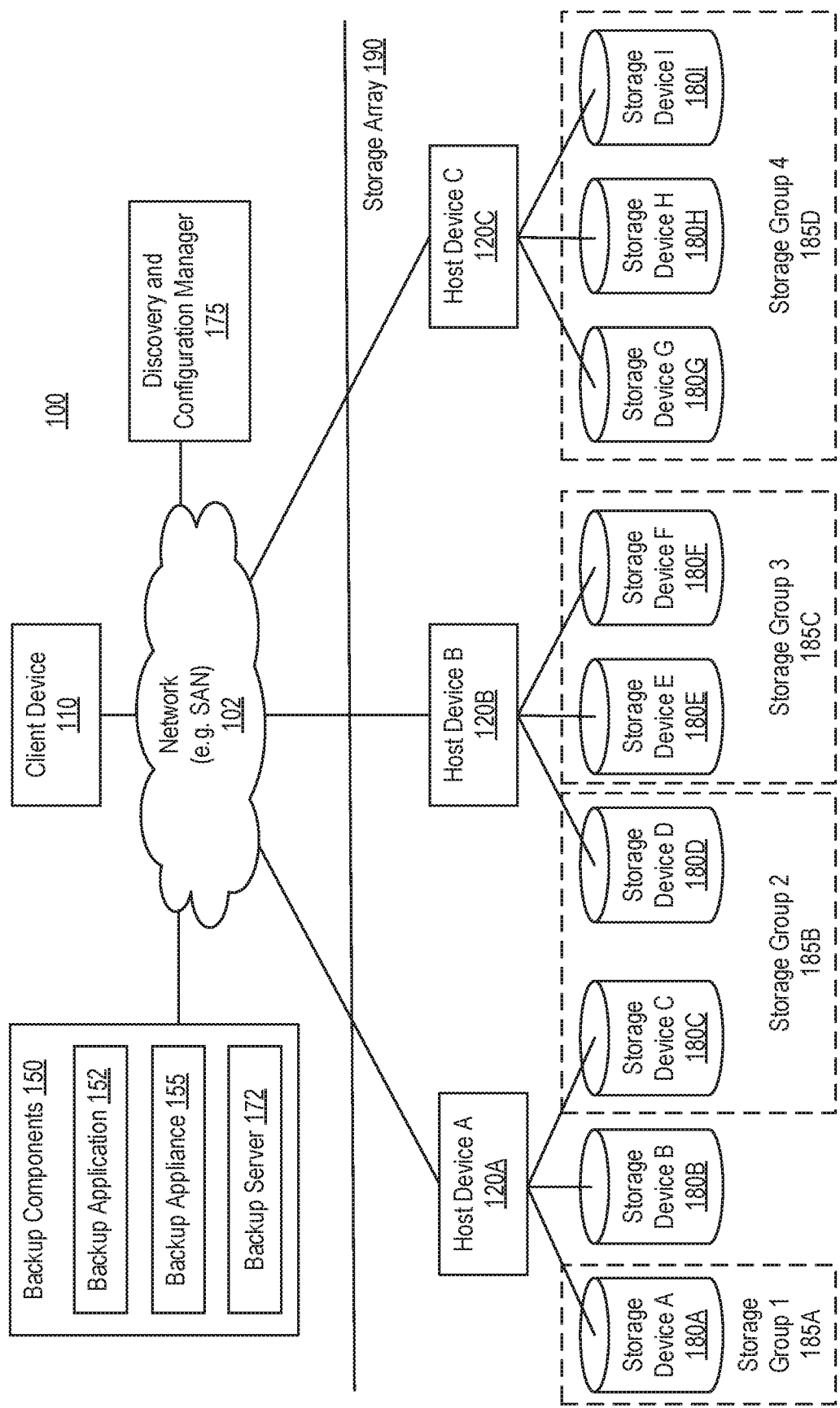
FIG. 1 is a block diagram illustrating an example operating environment for discovering and configuring storage devices according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for discovering and configuring backup settings for storage assets of a storage system. The system may perform such discovery and configuration for a storage array by providing an efficient centralized management capability. In addition, in some embodiments, the centralized management capability allows for the creation of backup policies that are host-aware. For example, the system may account for the interrelationship between storage devices, storage groups, and host devices to prevent potential inconsistencies and conflicts that may arise when creating a centralized backup policy.

To provide such capability, the system may discovery (or identify) particular storage devices provided by a particular host device. The system may also determine, for each of the storage devices, whether the storage device is associated with a storage group, and if so, add the storage group to a storage group list. The system may then identify, for each of the storage groups of the storage group list, all storage devices associated with the storage group, and then deem the storage group valid if all of the storage devices of the storage group are provided by the particular host device. Accordingly, the system may validate the protectable storage devices to avoid potential inconsistencies that may arise when assets are associated with different hosts. As a result, the system may create a backup policy for the storage system by including the validated storage devices. In addition, the system may determine configuration settings of the backup policy by retrieving information for the valid storage devices from any associated backup devices. For example, the system may determine whether there are particular configuration settings for a storage device, and if so, retrieve the necessary information. For example, the system may automatically retrieve configuration settings for an encapsulated storage device from an associated external storage array. Accordingly, in some embodiments, the system provides a centralized discovery and configuration tool that validates protectable storage assets.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for discovering and configuring storage devices according to one or more embodiments of the disclosure.

As shown, the environment 100 may include a client 110, backup components 150, backup and configuration manager 175, one or more host devices 120, and one or more storage devices (or components) 180 that are part of a storage array 190. The components of operating environment 100 may interact via a network 102, which may be any type of wired or wireless network including a local area network (LAN), a wide area network (WAN), or a direct communication link, or other suitable connection. In some embodiments, the network 102 may include a dedicated network or subnetwork that interconnects and presents a shared pool of storage devices to multiple servers. For example, the network 102 may include a storage area network (SAN).

A client 110 may act as a client from which data to be backed-up originates. The client 110 may host (or include, store, etc.) one or more client applications, and store data that may be protected as part of a data protection service. In some embodiments, the client 110 may be considered a host device, and/or may be in the form of a VM.

The backup components 150 may include a backup application 152 that performs (or manages, coordinates, etc.) the creation and recovery (or restoration) of data that may be backed-up. A backup application 152 may also cooperate with a backup client application to restore backup data (e.g. from storage array 190). In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

A host device 120 may be a client or server that may be part of a network (e.g. SAN) that accesses storage resources on the storage system. In some embodiments, a host configuration may be logical connection through which hosts or applications can access storage devices 180. As shown, the one or more host devices 120 (e.g. host devices 120A-C) may provide (or provision, or be associated with) one or more storage devices 180 (e.g. storage devices 180A-I). Accordingly, each host device 120 may be provisioned with a particular set of storage devices 180. For example, as shown, host device A 120A may provide storage devices 180A, 180B, and 180C; host device B 120B may provide storage devices 180D, 180E, and 180F; and host device C 120C may provide storage devices 180G, 180H, and 180I. In some embodiments, a host device 120 may be associated with external storage devices. For example, storage devices 180G-I that are associated with host device C 120C may be external storage devices. In some embodiments, an external storage device may be associated with a different provider than internal storage devices. Such external storage devices may also be associated with a secondary storage array (not shown). Accordingly, operations associated with such external storage devices may be performed using an interface of the secondary storage array.

In addition, the storage devices 180 may be part of a storage group 185. In some embodiments, a storage group 185 may be a logical collection of storage devices 180 that are managed together, for example, to form a single application. For example, a storage group 185 may be associated with a storage resource pool, a service level objective, or combination thereof. For instance, associating a storage group with a storage resource pool may define the physical storage to which data in the storage group can be allocated, and associating the storage group 185 with a service level objective may define the response time objective for that data. For example, as shown, storage device A 180A may be associated with storage group 1 185A; storage device B 180B may not be associated with any storage group; storage devices 180C, and 180D may be associated with storage group 2 185B; storage devices 180E, and 180F may be associated with storage group 3 185C; and storage devices 180G, 180H, and 180I may be associated with storage group 4 185D. Although not shown, in some embodiments, storage devices 180 may be associated with more than one storage group 185.

As shown, the one or more storage devices 180 may be part of, or form, the storage array 190, which is part of a data protection environment. The storage array 190 may be a storage entity (or component) that may be managed by the discovery and configuration manager 175. The storage array 190 may be used for block-based storage, file-based storage, or object storage. In some embodiments, the system may include a primary storage array (e.g. storage array 190) and a secondary storage array (not shown). In some embodiments, each storage array (e.g. primary storage array 190 and second storage array) may provide an interface (e.g. application programming interface (API)) that provides the ability to perform various storage and management related operations associated with the storage devices 180. For example, the API may provide various operations (e.g. a query operation) for identifying particular storage devices 180 based on various criteria (or characteristics, attributes, etc.). For example, in response to a query operation, the interface may indicate that host device A 120A provides storage devices 180A, 180B, and 180C. Similarly, in response to another query operation, the interface may indicate that storage group 2 185B is associated with the subset of storage devices including storage devices 180C, and 180D.

As further described herein, the discovery and configuration manager (or manager) 175 may coordinate (or manage, orchestrate, execute, automate, etc.) various operations (or processes, methods, etc.). For example, these operations may include discovering storage devices 180 that may be associated with particular hosts 120 or storage groups 185, and configuring settings for backup operations for such storage devices 180. Accordingly, the manager 175 may provide an interface that allows a user to perform various operations such as selecting particular storage devices 180 to be included as a protectable storage asset of a backup policy. In some embodiments, the manager 175 may be part of (or work in conjunction with) one or more of the backup components 150 (e.g. backup server 172). However, the manager 175 may also be part of the client 110, a separate device, or a combination thereof. In addition, in some embodiments, the manager 175 may be part of, or work in conjunction with, an operating system of a storage system. For example, the manager 175 may direct (or control, initiate, etc.) other components of the operating environment 100 to perform various operations as further described herein.

Figure 2:
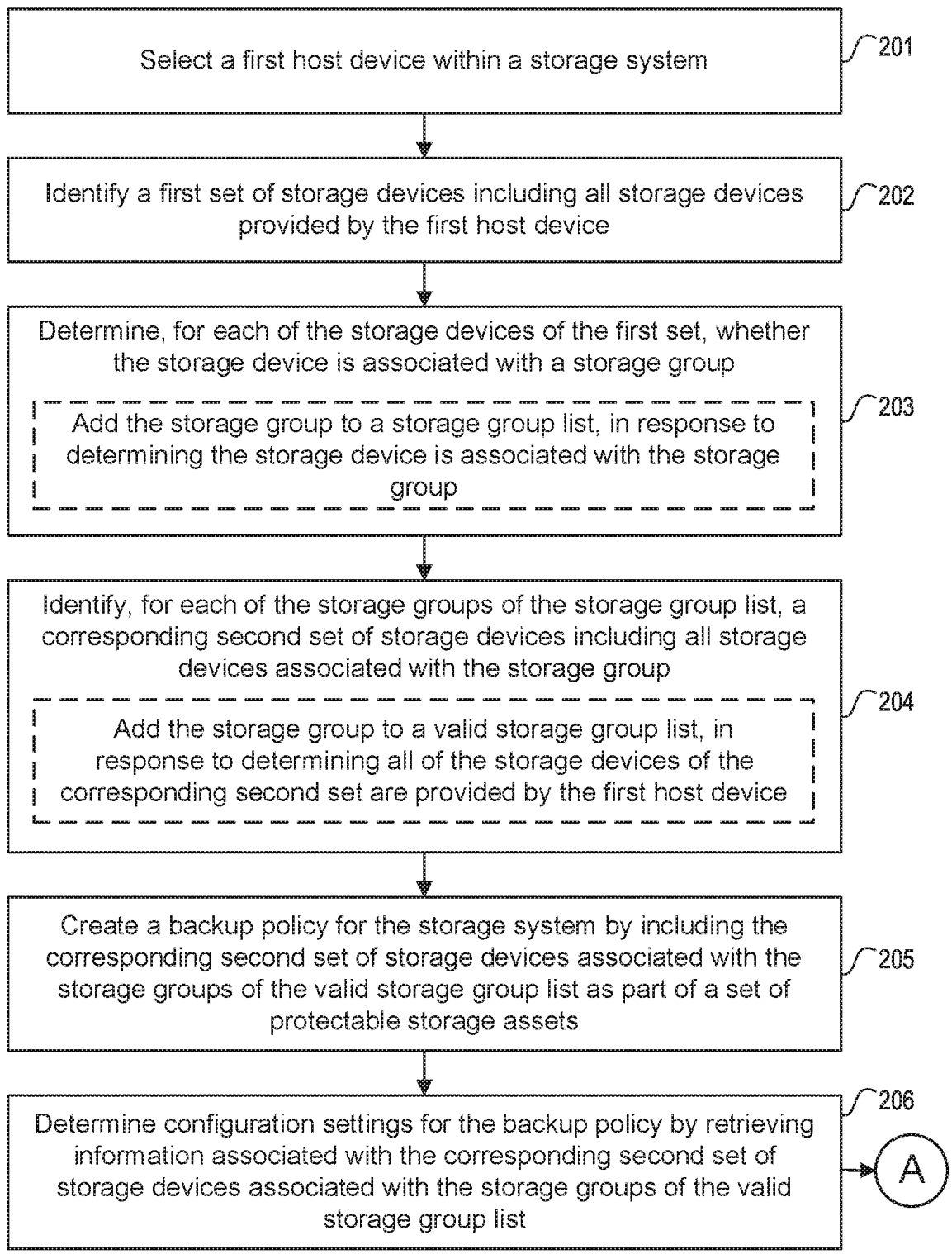
FIG. 2 is a flow diagram illustrating an example method of discovering storage devices associated with particular hosts of a storage system according to one or more embodiments of the disclosure.

FIG. 2 is a flow diagram 200 illustrating an example method of discovering storage devices associated with particular hosts of a storage system according to one or more embodiments of the disclosure. Process 200 may use processing logic, which may include software, hardware, or a combination thereof. For example, process 200 may be performed by a system including one or more components described in operating environment 100.

In 201, the system (e.g. backup and configuration manager 175) may select (or identify) a first host device (e.g. host device 120) within a storage system. For instance, referring to the example of diagram 100, the system may select host device A 120A as the first host device. In some embodiments, the system may select the first host device in response to receiving a request to create a backup policy specific to the first host device. As described, the storage system may include one or more host devices that provide (or provision) storage devices (e.g. storage devices 180) that are part of a storage array (e.g. storage array 190).

In 202, the system may identify a first set of storage devices including all storage devices provided by the first host device. For example, as shown in diagram 100, the system may identify storage devices 180A, 180B, and 180C as the first set of storage devices provided by host device A 120A. In some embodiments, the first set of storage devices may be identified using an interface (e.g. application programming interface (API)) of the storage array. For example, the system may perform a query operation provided by the interface to obtain the list of storage devices provided by the first device.

In 203, the system may determine, for each of the storage devices of the first set, whether the storage device is associated with a storage group. In response to determining the storage device is associated with the storage group, the system may add the storage group to a storage group list. For example, for each of the storage devices 180A, 180B, and 180C (e.g. the first set of storage devices), the system may determine whether the storage device is associated with a storage group. Accordingly, as shown in diagram 100, the system may determine that storage device A 180A is associated with storage group 1 185A, storage device B 180B is not associated with any storage group, and storage device C 180C is associated with storage group 2 185B. In response to such a determination, the system may add storage group 1 185A, and storage group 2 185B to a storage group list. In some embodiments, a centralized manager (e.g. backup and configuration manager 175) may maintain the storage group list as part of a centralized repository.

In 204, the system may identify, for each of the storage groups of the storage group list, a corresponding second set of storage devices including all storage devices associated with the storage group. In response to determining all of the storage devices of the corresponding second set are provided by the first host device, the system may add the storage group to a valid storage group list. For example, for each of storage groups 185A, and 185B (e.g. the storage groups of the current storage group list), the system may determine the corresponding storage devices associated with the storage groups 185A, and 185B respectively. For example, as shown in diagram 100, the system may determine that storage group 1 185A includes only storage device A 180A as the corresponding second set of storage devices associated with storage group 1 185A, and determine that storage group 2 185B includes storage devices 180C, and 180D as the corresponding second set of storage devices associated with storage group 2 185B. In response to such a determination, the system may add storage group 1 185A to a valid storage group list because all of the storage devices of the group (e.g. storage device 180A) are associated with the first host device (e.g. host device A 120A). In addition, in response to such a determination, the system may not add storage group 2 185B to the valid storage group list because storage group 2 185B includes storage device D 180D, which is not provided by the first host device (e.g. host device A 120A), and instead, is provided by the a different host device (e.g. host device B 120B). Accordingly, the system may deem storage group 2 185B as invalid for purposes of creating a backup policy for the first host device, and exclude storage group 2 185B from the valid storage group list. By excluding storage group 2 185B from the valid storage group list, the system may avoid any potential conflicts or backup inconsistencies that may arise from storage devices being provisioned by different hosts. For example, configuring a backup policy for host device A 120A that includes storage device D 180D of storage group 2 185B, may conflict with a backup policy for host device B 120B that also includes storage device D 180D of storage group 2 185B. Accordingly, in some embodiments, the system may ensure (or validate) that particular storage devices are provisioned to a particular host device. In addition, in some embodiments, the valid storage group list may be specific to a particular the host device 120 within the storage system.

In some embodiments, the system may identify the storage devices associated with a particular storage group using the interface of the storage array. For example, the interface may provide an operation that returns a list of storage devices that are part of a particular storage group. In some embodiments, the centralized manager may maintain the valid storage group list as part of the centralized repository.

In 205, the system may create a backup (or protection) policy for the storage system by including the corresponding second set of storage devices associated with the storage groups of the valid storage group list as part of a set of protectable storage assets. For example, the backup policy may be created to include the storage devices of the valid storage groups (e.g. storage groups of the valid storage group list). In some embodiments, the backup policy may be a host-specific backup policy for the first host device. More particularly, the system may create the host-specific backup policy by including the corresponding second set of storage devices associated with the valid storage group list for a particular host device. In some embodiments, the backup policy may be created using an interface provided by the backup and configuration manager. For example, the manager may provide a listing of the storage devices that were included in the storage groups of the valid storage group list as protectable storage assets. Accordingly, a user (e.g. backup administrator) may select the particular storage devices from the listing of protectable storage assets (or storage devices) to be included as part of a backup policy. For a host-specific backup policy, the system may display only the storage devices of the valid storage groups that are associated with a particular host. For example, using the example of diagram 100, when creating a backup policy as part of a centralized configuration (or initialization) for the entire storage array or storage system, the manager may list storage devices 180A, 180E, 180F, 180G, 180H, and 180I as protectable storage assets (e.g. storage devices from valid storage groups) after performing the identification process (e.g. operations 201-204) described above for each of the host devices (e.g. host devices 120A, 120B, and 120C). However, for a host-specific backup policy, for example, for host device A 120A, the system may list only storage device A 180A (e.g. storage devices from valid storage groups associated with storage group 1 185A) as a protectable storage asset. Accordingly, in either example, a user may proceed to select particular storage devices to include as part of a backup policy. For example, an automated storage procedure may be configured to include data from such selected storage devices. Accordingly, the process of including only certain storage devices to avoid potential backup conflicts and inconsistencies may be abstracted from the user.

In addition to performing the discovery of storage devices, the system may also perform a process to obtain configuration settings for the protectable storage assets of the backup policy.

For example, in 206, the system may determine configuration settings for the backup policy for the first host device. In some embodiments, the system may determine the configuration settings by retrieving information associated with the corresponding second set of storage devices associated with the storage groups of the valid storage group list. For instance, when determining configuration settings for storage device 180A, the system may retrieve configuration settings from a backup device associated with (or part of) host device A 120A. In some embodiments, the configuration settings for host device 120A may be retrieved using an interface associated with storage array 190.

Figure 3:
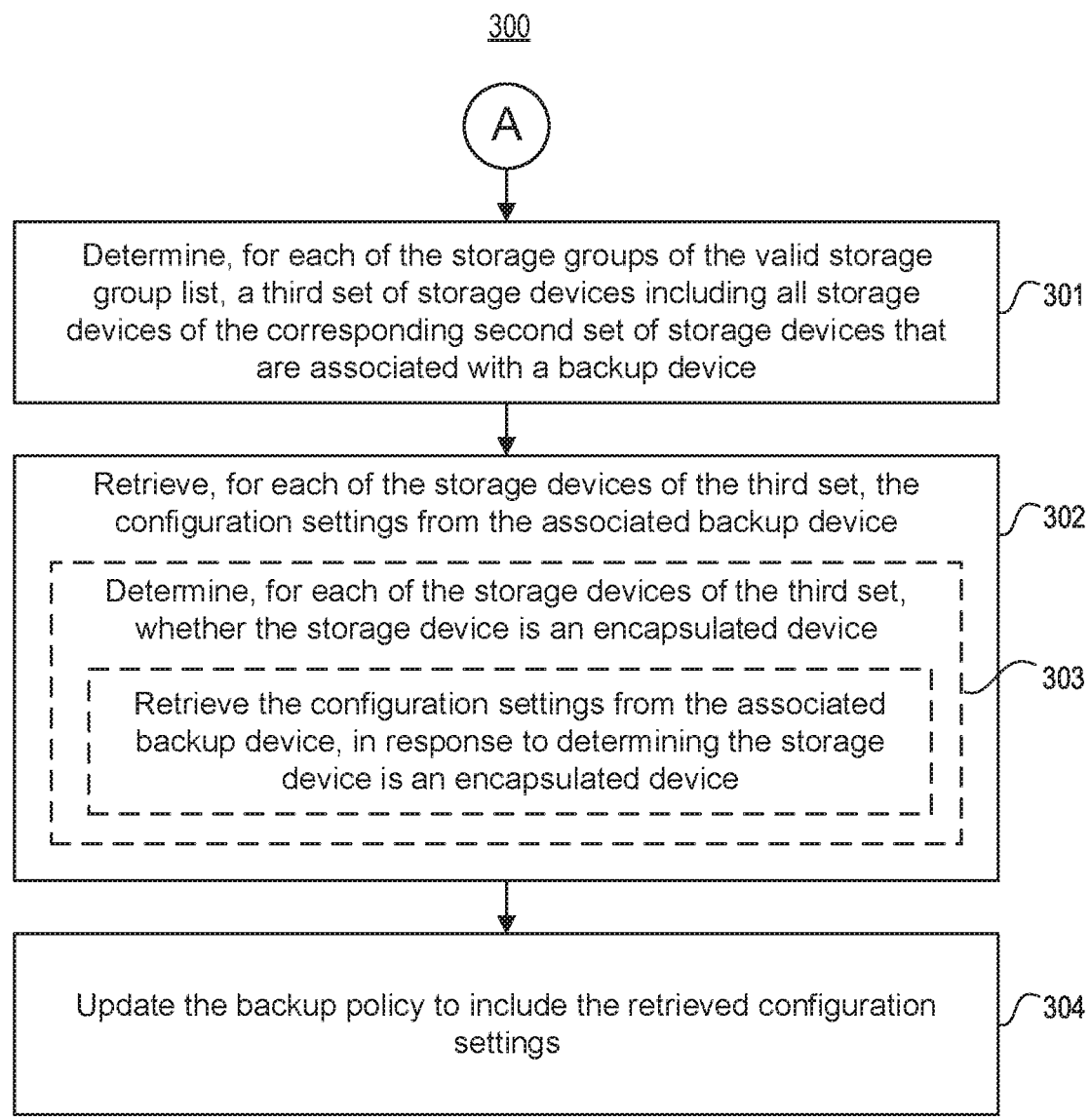
FIG. 3 is a process flow diagram illustrating an example process flow for determining configuration settings for a backup policy according to one or more embodiments of the disclosure.

In some embodiments, determining configuration settings may include one or more processes (or sub-processes) as further described with respect to FIG. 3.

FIG. 3 is a process flow diagram 300 illustrating an example process flow for determining configuration settings for a backup policy according to one or more embodiments of the disclosure. Process 300 may use processing logic, which may include software, hardware, or a combination thereof. For example, process 300 may be performed by a system including one or more components described in operating environment 100.

In 301, the system may determine, for each of the storage groups of the valid storage group list, a third set of storage devices including all storage devices of the corresponding second set of storage devices that are associated with a backup device. For example, a backup device may include a host device (e.g. host device 120), a backup server (e.g. backup server 172), or other component that may perform backup operations of the data stored by the storage devices (e.g. storage devices 180), and/or storage groups (e.g. storage groups 185). Accordingly, the system may determine whether a particular backup device stores configuration settings to perform a backup procedure. If so, the system may initiate a retrieval process.

For example, in 302, the system may retrieve, for each of the storage devices of the third set, the configuration settings from the associated backup device. For example, the backup and configuration manager may retrieve such configuration settings from different backup devices and store them as part of the centralized backup policy. In some embodiments, the configuration settings may be retrieved using an interface of the associated backup device. For example, a backup server (or application) may include an API that allows for the retrieval of various types of information associated with a backup procedure. For example, in diagram 100, if storage devices 180E, and 180F are associated with a backup device, the system may retrieve configuration settings for storage devices 180E, and 180F from a backup device associated with (or part of) host device B 120B. For instance, such configuration settings may be retrieved using an API associated with storage array 190.

In some embodiments, the processes of retrieving the configuration settings may include additional operations. For example, these additional operations may be based on whether particular storage devices are encapsulated devices. For example, particular storage devices may be external storage devices, or associated with a secondary storage array (e.g. external storage array), and accordingly, additional operations may be required to retrieve configuration settings.

For example, in 303, the system may determine, for each of the storage devices of the third set, whether the storage device is an encapsulated device. Accordingly, in some embodiments, the system may retrieve the configuration settings from the associated backup device in response to determining the storage device is an encapsulated device. For example, the associated backup device may be associated with a secondary storage array. Accordingly, in some embodiments, retrieving the configuration settings may include retrieving the configuration settings using an interface (e.g. API) of a secondary storage array associated with the backup device. For example, in diagram 100, if storage devices 180G, 180H, and 180I are encapsulated devices (e.g. associated with a secondary storage array), the system may retrieve configuration settings for storage devices 180G, 180H, and 180I from a backup device associated with (or part of) host device B 120B. For instance, such configuration settings may be retrieved using an API associated with the secondary storage array associated with host device C 120C.

In 304, the system may update the backup policy to include the retrieved configuration settings. For example, as part of creating the backup policy, the system may define certain configuration settings as part of an initialization process. Accordingly, upon a user selecting a particular storage device as an asset to protect for a backup policy, the system may automatically define a required set of configuration settings.

Accordingly, as described above, in some embodiments, the system may provide centralized discovery and configuration of protectable storage assets within a storage array.

Figure 4:
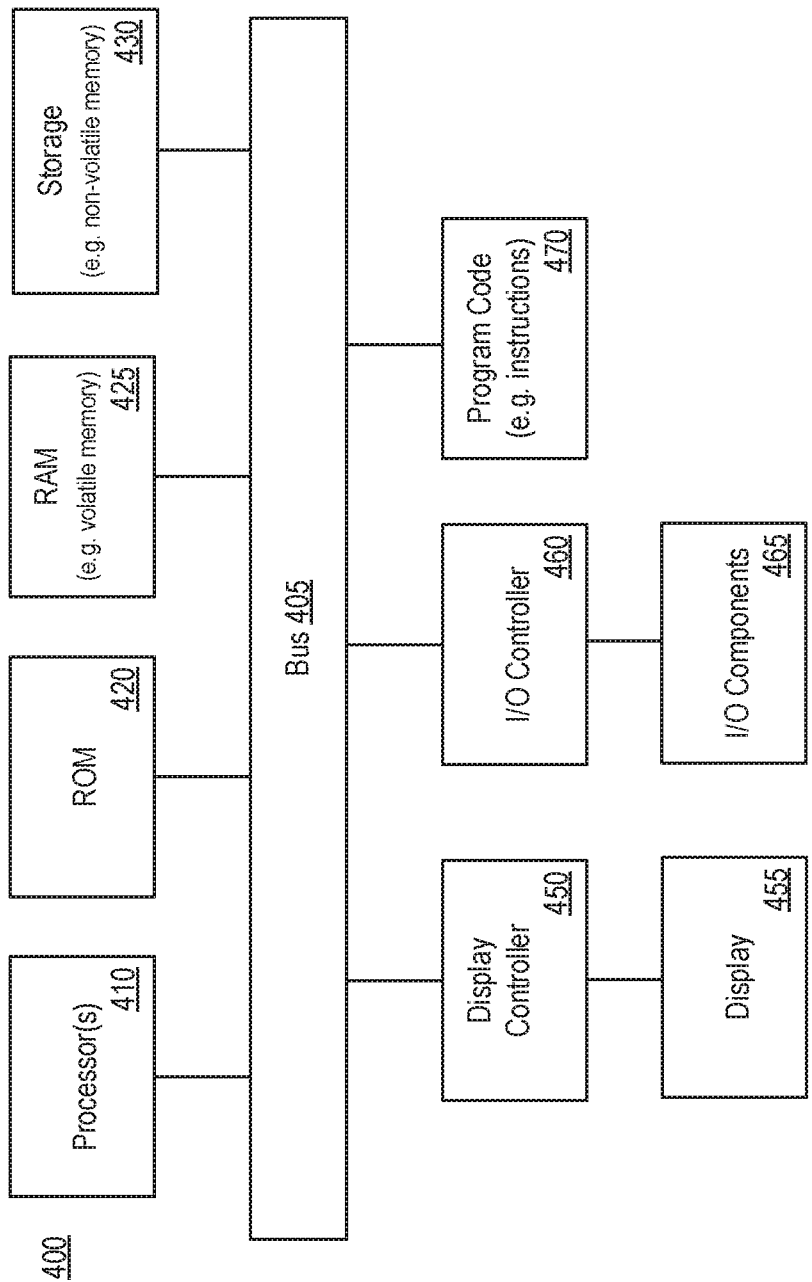
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. manager 175, host 120, storage array 190, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. manager 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed by the one or more processors, cause the one or more processors to:
   select a first host device within a storage system, the storage system including one or more host devices providing storage devices that are part of a storage array;
   identify, using an interface of the storage array, a first set of storage devices including all storage devices provided by the first host device;
   determine, for each of the identified storage devices of the first set, whether the storage device is associated with a storage group of a plurality of storage groups, and add the storage group to a storage group list, in response to determining the storage device is associated with the storage group, each of the storage group being a logical collection of storage devices that are managed together;
   identify, for each of the storage groups of the storage group list, a corresponding second set of storage devices including all storage devices associated with the storage group, and add the storage group to a valid storage group list, in response to determining all of the storage devices of the corresponding second set are provided by the first host device, each of the storage groups in the valid storage group list comprises storage devices that are provided by a same host device; and
   create a backup policy for the storage system by including the corresponding second set of storage devices associated with the storage groups of the valid storage group list as part of a set of protectable storage devices.

2. The system of claim 1, wherein the backup policy is a host-specific backup policy for the first host device.

3. The system of claim 1, wherein the plurality of instructions, when executed, further cause the one or more processors to:
   determine configuration settings for the backup policy by retrieving information associated with the corresponding second set of storage devices associated with the storage groups of the valid storage group list.

4. The system of claim 3, wherein determining configuration settings for the backup policy includes:
   determining, for each of the storage groups of the valid storage group list, a third set of storage devices including all storage devices of the corresponding second set of storage devices that are associated with a backup device;
   retrieving, for each of the storage devices of the third set, the configuration settings from the associated backup device; and
   updating the backup policy to include the retrieved configuration settings.

5. The system of claim 4, wherein the plurality of instructions, when executed, further cause the one or more processors to:
   determine, for each of the storage devices of the third set, whether the storage device is an encapsulated device, and retrieve the configuration settings from the associated backup device, in response to determining the storage device is an encapsulated device.

6. The system of claim 5, wherein retrieving the configuration settings from the associated backup device includes:
   retrieving the configuration settings using an interface of a secondary storage array associated with the backup device.

7. The system of claim 4, wherein the configuration settings from the associated backup device are retrieved using an interface of the associated backup device.

8. A method of discovering storage devices with a computing system comprising:
   selecting a first host device within a storage system, the storage system including one or more host devices providing storage devices that are part of a storage array;
   identifying, using an interface of the storage array, a first set of storage devices including all storage devices provided by the first host device;
   determining, for each of the identified storage devices of the first set, whether the storage device is associated with a storage group of a plurality of storage groups, and add the storage group to a storage group list, in response to determining the storage device is associated with the storage group, each of the storage group being a logical collection of storage devices that are managed together;
   identifying, for each of the storage groups of the storage group list, a corresponding second set of storage devices including all storage devices associated with the storage group, and add the storage group to a valid storage group list, in response to determining all of the storage devices of the corresponding second set are provided by the first host device, each of the storage groups in the valid storage group list comprises storage devices that are provided by a same host device; and
   creating a backup policy for the storage system by including the corresponding second set of storage devices associated with the storage groups of the valid storage group list as part of a set of protectable storage devices.

9. The method of claim 8, wherein the backup policy is a host-specific backup policy for the first host device.

10. The method of claim 8, further comprising:
    determining configuration settings for the backup policy by retrieving information associated with the corresponding second set of storage devices associated with the storage groups of the valid storage group list.

11. The method of claim 10, wherein determining configuration settings for the backup policy includes:
    determining, for each of the storage groups of the valid storage group list, a third set of storage devices including all storage devices of the corresponding second set of storage devices that are associated with a backup device;

retrieving, for each of the storage devices of the third set, the configuration settings from the associated backup device; and updating the backup policy to include the retrieved configuration settings.

12. The method of claim 11, further comprising:
determining, for each of the storage devices of the third set, whether the storage device is an encapsulated device, and retrieve the configuration settings from the associated backup device, in response to determining the storage device is an encapsulated device.

13. The method of claim 12, wherein retrieving the configuration settings from the associated backup device includes:
retrieving the configuration settings using an interface of a secondary storage array associated with the backup device.

14. The method of claim 11, wherein the configuration settings from the associated backup device are retrieved using an interface of the associated backup device.

15. A computer program product comprising a non-transitory computer-readable medium having a computer-readable program code embodied therein to be executed by one or more processors, the program code including instructions to:
select a first host device within a storage system, the storage system including one or more host devices providing storage devices that are part of a storage array;
identify, using an interface of the storage array, a first set of storage devices including all storage devices provided by the first host device;
determine, for each of the identified storage devices of the first set, whether the storage device is associated with a storage group of a plurality of storage groups, and add the storage group to a storage group list, in response to determining the storage device is associated with the storage group, each of the storage group being a logical collection of storage devices that are managed together;
identify, for each of the storage groups of the storage group list, a corresponding second set of storage devices including all storage devices associated with the storage group, and add the storage group to a valid storage group list, in response to determining all of the storage devices of the corresponding second set are provided by the first host device, each of the storage groups in the valid storage group list comprises storage devices that are provided by a same host device; and
create a backup policy for the storage system by including the corresponding second set of storage devices associated with the storage groups of the valid storage group list as part of a set of protectable storage devices.

16. The computer program product of claim 15, wherein the backup policy is a host-specific backup policy for the first host device.

17. The computer program product of claim 15, wherein the program code includes further instructions to:
determine configuration settings for the backup policy by retrieving information associated with the corresponding second set of storage devices associated with the storage groups of the valid storage group list.

18. The computer program product of claim 17, wherein determining configuration settings for the backup policy includes:
determining, for each of the storage groups of the valid storage group list, a third set of storage devices including all storage devices of the corresponding second set of storage devices that are associated with a backup device;
retrieving, for each of the storage devices of the third set, the configuration settings from the associated backup device; and
updating the backup policy to include the retrieved configuration settings.

19. The computer program product of claim 18, wherein the program code includes further instructions to:
determine, for each of the storage devices of the third set, whether the storage device is an encapsulated device, and retrieve the configuration settings from the associated backup device, in response to determining the storage device is an encapsulated device.

20. The computer program product of claim 19, wherein retrieving the configuration settings from the associated backup device includes:
retrieving the configuration settings using an interface of a secondary storage array associated with the backup device.

* * * * *